United States Patent [19]
Stoudt

[11] Patent Number: 5,489,077
[45] Date of Patent: Feb. 6, 1996

[54] SIGN SUPPORT LEG LOCKING MECHANISM

[76] Inventor: Theodore L. Stoudt, 16 Southwest Cellini Ct., Lake Oswego, Oreg. 97035

[21] Appl. No.: 232,989

[22] Filed: Apr. 25, 1994

[51] Int. Cl.$^6$ .................................... A47B 91/00
[52] U.S. Cl. ...................... 248/188.7; 40/610; 40/612; 403/82; 403/291; 404/9
[58] Field of Search ............. 404/9, 10; 248/188.7, 248/188.6, 167, 170, 436, 158, 408, 407, 166, 434, 168, 173; 40/606, 610, 612; 403/291, 83

[56] References Cited

U.S. PATENT DOCUMENTS

| | | | |
|---|---|---|---|
| 4,593,879 | 6/1986 | Seely et al. | 248/624 |
| 4,691,892 | 9/1987 | Grewe et al. | 248/624 |
| 4,888,894 | 12/1989 | Brown, Jr. | 40/606 |
| 5,152,091 | 10/1992 | Leach | 40/603 |
| 5,318,258 | 6/1994 | Lang | 40/603 X |
| 5,340,068 | 8/1994 | Sarkisian et al. | 40/612 X |

*Primary Examiner*—Ramon O. Ramirez

[57] ABSTRACT

A sign support base comprising a staff base to which a plurality of plates are secured, the plates having pivotal legs secured thereto, the pivot means comprising a resilient mechanism for biasing the leg toward the plate and engaging means comprising a moveable pin resiliently biased outwardly from the leg for engaging in apertures in the plate, the legs, plates, pivot means and engaging means being so constructed that movement of the distal end of the leg disengages the resiliently biased pin from the apertures is disclosed.

10 Claims, 1 Drawing Sheet

SIGN SUPPORT LEG LOCKING MECHANISM

FIELD OF THE INVENTION

This invention relates to portable stand mechanisms such as are used in the signing industry. A typical example of the type of mechanism to which this relates are conventional temporary highway signs which are placed temporarily along the side or center of a highway to indicate that there are men working in the area, construction is underway, etc. Display signs for advertising sales, products, services, etc. may also utilize this invention.

BACKGROUND OF THE INVENTION

There are a great many types of portable signs that are used for temporary display of warnings, advertisements and the like. One of the more common types of signs, particularly in the highway construction sign industry, involves a single vertical staff with a mechanism on the top of the staff for supporting the sign and a base. The base, in many examples, is made up of a plurality, three or four usually, legs that in the storage and handling position fold up adjacent to the staff or the staff holder and in the use position fold outwardly to support the staff vertically above the ground, pavement, or other surface.

There are many kinds of mechanisms for locking the leg in one of two or more positions. One position is the storage position with leg locked adjacent the staff or staff holder. The other position is the extended position for supporting the staff vertically on a surface. The legs may also be positionable in a plurality of orientations relative to the staff to provide a higher or lower support, to accommodate differences in the support surface, e.g. a rough or uneven support surface. While many extended positions can be provided, the fundamental premise is that there is at least one extended position. It is to a mechanism for locking the device in the storage position and, selectively, locking the legs in the extended use position that the present invention is directed.

One mechanism commonly used involves the plurality of plates extending from the staff or staff base, a leg pivotly connected at the proximal end to the plate, and a mechanism for locking the leg in the storage position adjacent to the staff or in the extended position. One of the mechanisms for providing such locking comprises a plate attached to the staff or staff base having an aperture adjacent the staff or staff base and having another aperture spaced outwardly from the staff or staff base. The plate, in this type of device, extends outwardly from the staff base with a locking mechanism slightly outwardly disposed relative to the pivot mechanism. The locking device engages, selectively, the aperture adjacent the staff base or the aperture distal from the staff base, both aperture lying on arc of a circle in which the pivot is the center point. The locking mechanism, alternatively, is engaged in the plight distal from the staff base. In this type of sign, there have been generally two types of approaches. In one approach, a boss, pin or other extension is formed on or attached to the leg. The leg is forced away from the plate so that the pin or boss is removed from the aperture and the leg is then pivoted to the desired position. In this kind of mechanism the boss or pin usually rides against the plate. The natural result of this type of mechanism is that movement is rather difficult and the boss or pin wears a groove in the plate. This, in turn, often makes operation more difficult. Generally speaking, this type of mechanism is useful but not fully satisfactory.

Another type of mechanism is similar except that rather than having a boss or a pin extending permanently from the leg, a resiliently biased pin is provided for insertion into the respective aperture in the plate. In operation, the user must reach down and pull the string biased pin outwardly, freeing it from the aperture, and then moves the leg to the desired position and return the pin, using its natural resilient mounting, into the selected aperture. This mechanism solves the problem of gauging the plate, as previously described. However, this mechanism is not entirely satisfactory because it requires that the operator bend over each time a leg is moved, either from the storage position to the support position, or vise-a-versa, or to any of the alternative positions if a plurality of such positions are provided by way of a plurality of aperture. This is not only time consuming, but it is tiring and sometimes difficult for those who have back problems.

The present invention solves both of the aforesaid problems by a unique interacting combination of mechanisms, which individually, are previously known in the art.

SUMMARY OF THE INVENTION

The present invention is embodied in a sign support base that comprises a staff base, a plurality of legs pivotally mounted to plates extending from the base, the plates defining at least two apertures, pivot means comprises a resilient mechanism for biasing the leg toward the plate and also for permitting movement of the distal portions of the leg away from the plate and engaging means comprises a moveable pin resiliently biased outwardly from the leg for engaging in the respective apertures, the legs, plates, pivot means and engaging means being so constructed that movement of the distal end of the leg disengages the resiliently biased pin from the apertures.

DESCRIPTION OF THE PREFERRED EMBODIMENTS

Figure 1:
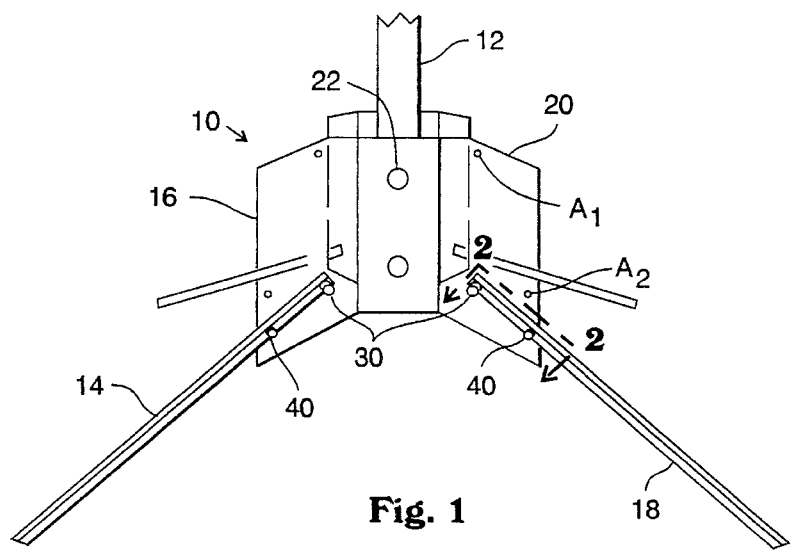
FIG. 1 is a generalized view of a sign stand base of the type under consideration here.

In the following description, references made to the drawing in the drawing shows an exemplary embodiment of the invention. It will be recognized, however, that many types of spring biased pins, biasing mechanisms, pivoting mechanisms, etc. may be used without departing from the spirit and scope of the invention.

Referring first to FIG. 1, the sign stand pin comprises a staff base 12. The staff base may be an elongated staff or may simply may be a short stubbed staff which can receive an elongated staff. Both types of mechanisms are well known in the art.

The support for the staff base comprises a plurality of legs, exemplary of which are legs 14 and 18 which are, respectively, pivotly connected at or near the proximal end to plates 16 and 20. The plates extend outwardly from the staff base. In a typical base arrangement, three, four, five or six such plates may be used, depending on the number of legs that are desired. Four is the most commonly used number of legs.

Figures 2, 3:
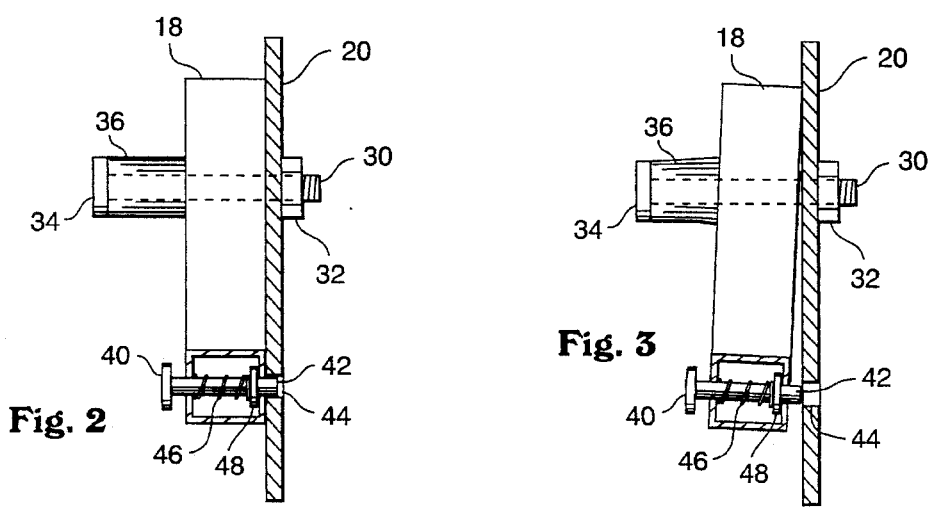
FIG. 2 is an enlarged scale showing the details of the leg locking device of this invention locking the leg in a selected position, in this instance, in the support position.
FIG. 3 is a view of the leg lock mechanism of FIG. 2 showing the leg in a movement position for lifting the pin out of the aperture and permitting the leg to pivot so as to place the pin in a desired aperture either in the storage and handling position or in a support position.

Now, referring to FIG. 2, a greatly enlarged view of a portion of leg 18 and plate 20, along with details of the pivoting and locking mechanism are depicted. The leg 18 is pivotly connected to the plate 20 by means of bolt 30 and nut 32. The bolt 30 has enlarged head 34. A polyurethane or other type of resilient space 36 is received about the bolt between the head 34 and the leg 18. This spacer, being resilient and compressible, permits the leg to be moved outwardly at its distal end such that the distal portions of the leg move away from the plate. The locking mechanism comprises a resiliently biased pin 40 which comprises a distal end 42 which is receivable in one or more aperture 44 in the plate. Biasing is provided by means of a spring 46 and a keeper disk or washer 48. It would be appreciated, of course, that a coil spring such as the compression spring 46 may be used or that other types of springs, such as, for example, a Bellville spring, or a resilient washer similar to the spacer 36 may be used to provide resiliency for the pin 40 permitting it to move outwardly from the plate without movement of the leg. Likewise, a compression coil spring could easily be used in place of the polyurethane resilient spacer 36.

Figures 4, 5:
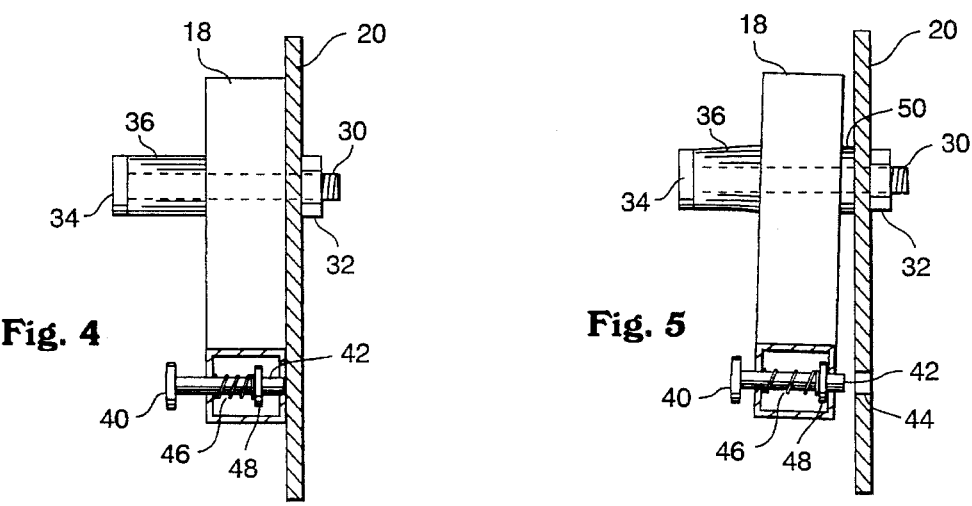
FIG. 4 shows the same mechanism with the leg in the intermediate movement position, with the resilient pin resting against the plate.
FIG. 5 is a slightly modified version of the device of FIGS. 2–4, shown in a configuration analogous to that of FIG. 3.

Referring now to FIG. 3, it will be noted that in this depiction, the leg 18 is, at its distal portion, forced away from the plate. This removes the pin tip 42 from the aperture 44. The outward movement of the leg is resiliently resisted by the compression of the spacer 36 such that when the force is removed from the distal portion of the leg, the leg will return to a normal position with the leg resting against the plate. Such a position is shown in FIG. 4 which depicts a position during pivotal movement. It will be noted that it is note necessary for the operator to maintain the leg at an angular spacing from the plate during pivoting of the leg. The leg can simply be allowed to return to its resting position against the plate and pivoted to the point where the pin will again engage another aperture.

FIG. 5 depicts a mechanism substantially identical to FIGS. 2, 3, and 4 with exception that a washer 50 is interposed between the leg and the plate. The washer is not necessary but prevents easier movement of the distal portion of the leg away from the plate and hence easier operation of the device. This is accomplished by placing the fulcrum about which the leg moves when it is forced away from the plate closer to the pivot point.

The operation of the device is as simple and straight forward and highly advantageous to the user. In use, if the leg is in the storage position with the pin received in an upper aperture $A_1$, shown in FIG. 18, the user simply grasps the end of the leg and forces it slightly outwardly from the plate and begins the pivotal movement of the leg toward the lower end of the plate 20. Once the pin is free of the aperture $A_1$, then the user may simply release the leg and it will fall to its lower position and the pin will automatically engage and be received in a support aperture as described previously. The arrangement of the aperture in the pivot points is, as described, well known in the art. A second support aperture $A_2$, also shown in FIG. 1, may be provided if desired. Indeed, any number of aperture may be provided to permit the leg to be locked in any desired position.

When it is desired to return the leg to the storage position, the user simply turns the sign stand on its side, grasps the end of the leg, and pulls the leg distal portion outwardly slightly to disengage the pin from the aperture and moves the leg slightly toward the staff base. Again, the leg may be simply dropped and it will return to the storage position. Alternatively, the user may, if he desires, bend over and grasp the leg, however this is a difficult way to perform an operation that may be more simply performed by laying sign base on its side.

The unique coaction of the resilient spacer 36, the bolt 30 down the leg 18, and the resilient pin 40 obviates the wear which infected the fixed pin sign stands of the prior art and also obviates the need for the user to bend over and grasp the pin. The importance of this will be appreciated not only in terms of saving the back from pain or injury, but with the realization that these signs are very frequently used in cold or inclement weather and the users hands are cold and its very difficult to grasp a very small object such as the pin. Such grasping is not necessary in the present invention, all that is necessary is that the end of the leg be grasped.

It will also be apparent that this is not a matter of mechanisms working independently of each other. There is a unique coaction which gives a new result not heretofore accomplished in the sign industry.

INDUSTRIAL APPLICATION

This invention finds use in the signage industry, particularly with highway signs.

What is claimed is:

1. In a sign support base comprising a staff base, a plurality of plates secured to and extending outwardly from the staff base, a plurality of legs each having a proximal end and a distal end, pivot means securing the proximal end of the respective legs to the respective plates, said plates defining at least two apertures lying on the are of a circle defined by the pivot means, one of said apertures being generally adjacent the staff base and the other aperture being outwardly spaced from the staff base, and means on the legs for selectively engaging in said apertures, the improvement wherein the pivot means comprises a resilient mechanism for biasing the legs toward the plate and also for permitting movement of the distal end of the legs away from the plate and the engaging means comprises a moveable pin resiliently biased outwardly from the legs for engaging in the respective apertures, the legs, plates, pivot means and engaging means being so constructed that movement of the distal end of the legs disengages the resiliently biased pin from the apertures.

2. The invention of claim 1 wherein the resilient mechanism of the pivot means is a compressible resilient polymer spacer.

3. The invention of claim 2 wherein the pivot means comprises an elongate fastener extending through the polymer spacer, the respective leg and plate.

4. The invention of claim 3 wherein the engaging means comprises a pin extending through the respective leg and a compression spring received about the pin.

5. The invention of claim 4 wherein the leg comprises a hollow tube and the compression spring is in the tube.

6. The invention of claim 1 wherein the engaging means comprises a pin extending through the respective leg and a compression spring received about the pin.

7. The invention of claim 6 wherein the leg comprises a hollow tube and the compression spring is in the tube.

8. The invention of claim 7 wherein the resilient mechanism of the pivot means is a compressible resilient polymer spacer.

9. A staff support comprising a base, plates secured to and extending outwardly from the base, legs having first and second ends, pivot means securing one end of respective legs pivotally to respective plates, the plates defining apertures lying on the arc of a circle the center of which is defined by the pivot means, means on the legs constructed and configured for selectively engaging in said apertures, and resilient spacers mounted on the pivot means, the combination of plates, legs, pivot means and resilient spacers being so constructed and configured that the respective resilient spacers bias the second end of the respective legs toward the respective plates and permit the second ends of the respective legs to be moved selectively toward and away from the respective plates thereby selectively inserting the engaging means into, and removing the engaging means from, the apertures in the plates.

10. The invention of claim 9 wherein the pivot means comprises an elongate fastener extending through the respective resilient spacers, legs and plates.

* * * * *